B. ESSIG.
Combined Vegetable Cutter and Coffee Mill.
No. 22,070. Patented Nov. 16, 1858.
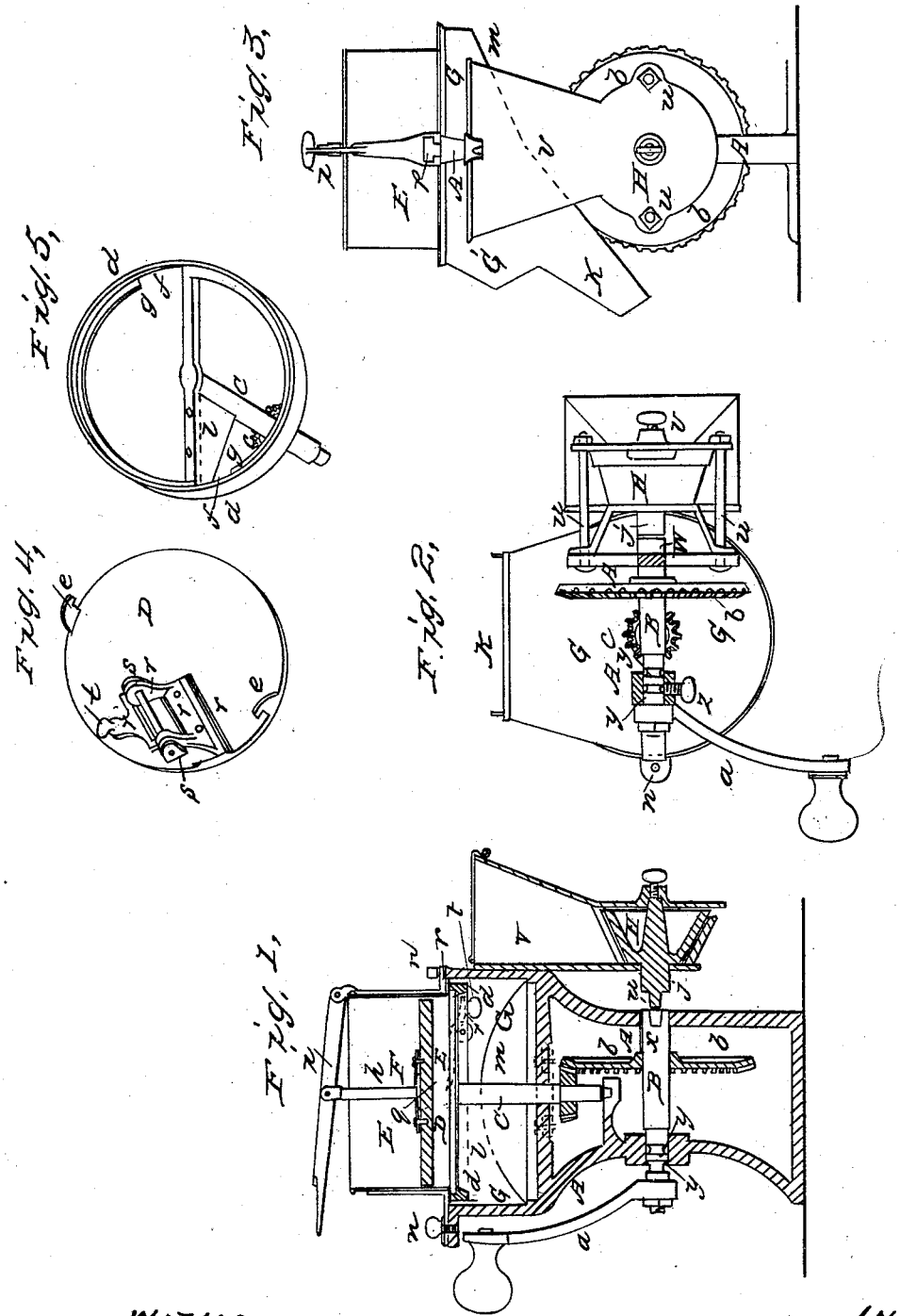
WITNESSES:
INVENTOR:

UNITED STATES PATENT OFFICE.

BARTHOLOMEW ESSIG, OF PITTSBURG, PENNSYLVANIA.

VEGETABLE-CUTTER AND COFFEE-MILL COMBINED.

Specification of Letters Patent No. 22,070, dated November 16, 1858.

*To all whom it may concern:*

Be it known that I, BARTHOLOMEW ESSIG, of Pittsburg, in the county of Allegheny and State of Pennsylvania, have invented a new and useful Mode of Combining a Vegetable-Cutter and Coffee-Mill; and I hereby declare that the following is a full, clear, and exact description of the same, reference being had to the accompanying drawings, making a part of this specification.

The nature of my invention consists in a novel mode of combining a rotary cutter for cutting and slicing vegetables, such as cabbage, turnips, onions, apples and other vegetables used in cookery, with a coffee- or spice-mill, in such a manner, that either the cutter can be operated and the mill be set out of gear, or that the mill is operated, when the cutter is disengaged.

To enable others skilled in the art to make and use my invention, I will proceed to describe its construction and operation.

Figure 1 is a vertical section of the machine; Fig. 2 a view of the same from below, the foot of the frame being represented as being cut away. Fig. 3, is a face view of the whole machine. Fig. 4, a perspective view of the cutter disk showing its underside; and Fig. 5 a perspective view of the spindle and ring supporting the cutter disk, which will be more fully described in the description below.

In all these figures the same letters of reference are marked on alike parts.

A is the frame work; B the horizontal crank shaft, with the crank $a$, $b$ a bevel wheel set on the shaft B.

C is a vertical spindle, with a pinion $c$, gearing into the bevel wheel $b$.

D is the cutter disk, which is supported by and fastened to the ring $d$ of the vertical spindle in such a manner, that it may be easily taken off, or secured to it; for this purpose the disk is provided with the two projections or hooks $e\ e$, and two corresponding notches $f\ f$ are cut out of the ring $d$; the disk is laid on the ring $d$ so that the projections enter into the notches $f$, and then turned, so that the hooks of the projections $e\ e$ lock under the edges $g\ g$ of the ring.

E is a hopper or box, containing the vegetable to be cut; F a follower, with a stem $h$ and lever $i$, by means of which the vegetable is pressed or kept down on the cutter disk.

G, G', is a casing, around the cutter disk, of which the portion G is cast or attached to the frame work A, and the other portion G' made in one piece with the box E, and forming a chute $k$, through which the vegetable after being cut, passes out.

In order to effect a proper discharge of the vegetable from under the cutter disk, the bottom ($m$) of the portion G, is made inclined, and a scraper $l$, is provided at the vertical spindle C, which passes closely over the said incline, clearing it from any substances resting thereon. The box E, with the part G' of the casing, is fastened to the frame work, by means of the thumb screw $n$, and the flange $o$, the forked end of which locks into the hook $p$ at the frame; by loosening the screw $n$, the box and part G' of the casing can be taken off, whereby an easy access to the cutter disk is had, for the purpose of cleaning out, or adjustment of knives.

$q$ is the knife, which is shown from below in Fig. 4; the same is fastened to a lever $r$, which has its fulcrum in the flanges $s\ s$ of the disk D, and is provided with a set screw $t$ at its other arm, whereby the knife can be adjusted.

H is the coffee-mill or spice-mill, fastened firmly to the framework A by the screwbolts $u$; $v$ is the hopper of the same.

The end of the shaft or spindle J of the mill, is formed into a square pivot ($w$) which fits into a corresponding recess ($x$) in the end of the crankshaft B. The crankshaft is arranged that its position can be changed in the direction of its axis, in Fig. 1, it is shown in such a position, that the bevel wheels $b$ and $c$ are in gear, but that it has no connection with the spindle J of the mill; in Fig. 2, however, the position of the shaft is changed so, that the pivot $w$, of the mill spindle enters into the recess $x$, but that the bevel wheels $b$ and $c$ are out of gear. Thus by simply shifting the shaft B into the one or the other position, either the mill or the cutter may be thrown in or out of gear.

In order to secure the shaft in the one or in the other position, I provide, two grooves $y$, $y'$, in the shaft, and a thumb screw $z$ (passing through the frame) which taps into the groove $y$ when the cutter is to be operated, or into the groove $y'$, when the mill is to be used. By this simple arrangement I combine two household instruments, which heretofore have always been used separately, into one machine, forming thus a useful article of household, suited for the purposes as above stated and which can be easily kept clean, and in proper order.

I wish also to state, that by the mode in which the cutting disk is fastened to its seat or ring $d$, I am enabled to take the same easily off, and use other disks (with different shapes of knives, as may be suited for different vegetables), in place of the same, whereby the variety of purposes, to which the machine may be used, as a kitchen implement, is still more increased.

I wish it understood, that I do not claim in this, any parts or devices of the cutting apparatus, such as the adjustment of the knife, or the attachment of the cutter disk to its seat; or any parts of the coffee mill, considered by themselves; but What I do claim herein as new and desire to secure by Letters Patent is:

The mode of arranging and combining a vegetable cutter and a coffee mill, in such a manner, that by means of the sliding shaft B, either of the two may be set in or out of gear, substantially as herein set forth.

BARTHOLOMEW ESSIG.

Witnesses:
  LEONARD S. JOHNS,
  WM. SHEIBY.